(12) United States Patent
Bhattacharjee et al.

(10) Patent No.: US 7,804,943 B2
(45) Date of Patent: Sep. 28, 2010

(54) MANAGEMENT FOR A HETEROGENEOUS POOL OF PROCESSORS FOR THE ASSIGNMENT OF ADDITIONAL LOAD

(75) Inventors: Mrinmoy Bhattacharjee, Aurora, IL (US); Christopher D. Liesen, Naperville, IL (US); Alejandro Maya, Plainfield, IL (US); Barrett D. Milliken, Evanston, IL (US); Carol A. Toman, Westmont, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1097 days.

(21) Appl. No.: 11/494,562

(22) Filed: Jul. 27, 2006

(65) Prior Publication Data

US 2008/0046894 A1      Feb. 21, 2008

(51) Int. Cl.
    H04M 15/00   (2006.01)
(52) U.S. Cl. .............................. 379/112.02; 379/112.04; 712/220; 712/227
(58) Field of Classification Search ............ 379/112.01, 379/112.02, 112.04, 112.1, 133, 134, 221.03, 379/221.04, 221.05, 221.07; 370/229, 230, 370/235, 236, 236.1; 712/28, 32, 34, 36, 712/41, 220, 227, 228, 247
See application file for complete search history.

(56) References Cited

U.S. PATENT DOCUMENTS

| | | | | |
|---|---|---|---|---|
| 4,974,256 | A * | 11/1990 | Cyr et al. ................ | 379/112.04 |
| 5,440,719 | A * | 8/1995 | Hanes et al. ................... | 703/21 |
| 5,548,533 | A * | 8/1996 | Gao et al. .................... | 709/235 |
| 6,160,875 | A * | 12/2000 | Park et al. .................... | 379/133 |
| 6,661,776 | B1 * | 12/2003 | Kaufman et al. ............ | 370/234 |
| 7,190,766 | B1 * | 3/2007 | McDonald et al. ............ | 379/22 |
| 2005/0071019 | A1 * | 3/2005 | Liao ........................... | 700/28 |
| 2005/0276222 | A1 * | 12/2005 | Kumar et al. ................ | 370/235 |
| 2008/0104377 | A1 * | 5/2008 | Wang et al. .................. | 712/225 |
| 2009/0003215 | A1 * | 1/2009 | Wang et al. .............. | 370/236.1 |
| 2010/0091694 | A1 * | 4/2010 | Wang et al. .................. | 370/312 |

\* cited by examiner

*Primary Examiner*—Binh K Tieu
(74) *Attorney, Agent, or Firm*—Carmen Patti Law Group, LLC

(57) ABSTRACT

An exemplary method implements load management for large granularity processes on application processors, APs. First data associated with the primary processes running on each AP is periodically collected, where the first data is proportional to processor occupancy, PO, for the primary processes running on each AP. Second data associated with auxiliary processes running on each AP is periodically collected where the auxiliary processes directly support the primary processes running on the respective AP. The second data is proportional to PO for the auxiliary processes running on each AP. A processor scaling factor and an overhead scaling factor are calculated for each AP based on the first and second data, respectively. The total amount of additional PO a second AP would incur to run a first large granularity process is determined by two aspects. The amount of additional PO due to the primary process is determined by applying at least the second processor scaling factor to a value related to an amount of primary process PO of the first process running on the first AP. The amount of additional PO due to overhead processes is determined by applying the overhead scaling factor of the second AP to the previously determined amount of additional PO due to the primary processes determined for the second AP.

20 Claims, 3 Drawing Sheets

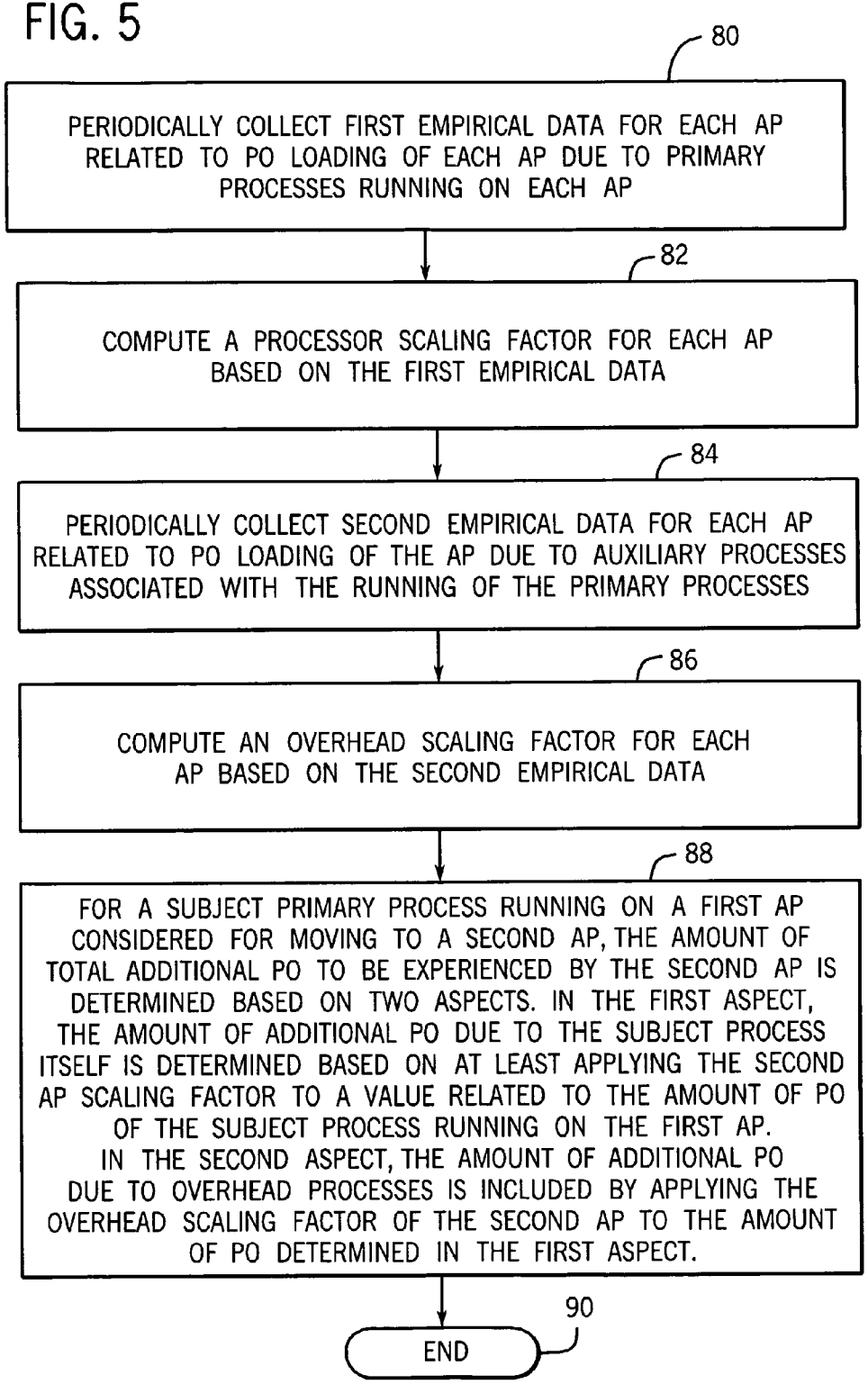

MANAGEMENT FOR A HETEROGENEOUS POOL OF PROCESSORS FOR THE ASSIGNMENT OF ADDITIONAL LOAD

BACKGROUND

This invention relates to multiprocessor architectures and more specifically to managing the increase in load that would be incurred by a processor due to the assumption of running an additional process.

Some applications demand high reliability in a real-time environment such as telecommunications, financial transactions, etc. Such applications are typically supported by multiple processors. In one high reliability architecture, the processors are grouped into pairs where each processor in a pair is engineered to have sufficient spare capacity to take over the processes from its mate should the mate processor fail. For each active primary process running on one processor in the pair, the other processor in the pair will have a backup copy that can be activated in the case of failure of its mate. The load of processes supported by the pair of processors is engineered so that each processor has sufficient capacity to handle the additional load of its mate in the event of a processor failure. Although this arrangement is effective in providing high reliability, it is not very efficient with regard to the utilization of processor resources since each processor in the pair must be capable of assuming all of the active processes handled by both processors in the event of a processor failure.

Another type of backup is provided by the so-called "N+1" approach. In an environment in which N active processors are required for handling the workload, an extra processor, i.e. the "+1" processor, is utilized as a spare to provide a backup to take over for a failed one of the N processors. In this system all of the responsibilities that were being handled by the failed n processor are transferred to the +1 processor. Thus, the +1 processor must have sufficient capacity to handle the load of the heaviest loaded n processor. From a perspective of utilization of processor resources, this approach is obviously more efficient than the above-described pairing approach. However, the +1 processor cannot be made available on a real-time basis since it cannot simultaneously carry a backup copy of the processes running on all of the N processors, and since it cannot be predicted which of the N processors will fail. Therefore, this approach is best suited for applications in which only non-real-time backup is required.

SUMMARY

It is an object of the present invention to provide improved load management for a pool of heterogeneous processors so that the addition of a process to the workload of one processor can be accurately predicted.

An exemplary method implements load management for large granularity processes on application processors, APs. First data associated with the primary processes running on each AP is collected, where the first data is proportional to processor occupancy, PO, for the primary processes running on each AP. Second data associated with auxiliary processes running on each AP is collected where the auxiliary processes directly support the primary processes running on the respective AP. The second data is proportional to PO for the auxiliary processes running on each AP. A processor scaling factor and an overhead scaling factor are calculated for each AP based on the first and second data, respectively. The total amount of additional PO a second AP would incur to run a first large granularity process is determined by two aspects. The amount of additional PO due to the primary process is determined by applying at least the second processor scaling factor to a value related to an amount of primary process PO of the first process running on the first AP. The amount of additional PO due to overhead processes may be determined by applying the overhead scaling factor of the second AP to the previously determined amount of additional PO due to the primary processes determined for the second AP.

DESCRIPTION OF THE DRAWINGS

Features of exemplary implementations of the invention will become apparent from the description, the claims, and the accompanying drawings in which:

FIG. 5 is a flow diagram of steps in accordance with an illustrative embodiment of the present invention by which scale factors are created and used to determine the increase in processor occupancy of an AP if another process were to be loaded and run on the AP.

DETAILED DESCRIPTION

An illustrative embodiment of the present invention is described for processors utilized in telecommunications equipment. However, it will be understood that this application merely represents one of many different environments that would benefit from utilization of an embodiment of the present invention. Embodiments of the present invention are especially, but not exclusively, suited for use in multiprocessor environments that run large granularity processes where each process occupies a substantial amount of total processor occupancy (available capacity to do work), e.g. 3%-30%. It should be noted that computing systems with APs that normally run processes of a relatively small granularity do not present the same obstacles and challenges. That is, it is much easier to balance a desired level of total PO of an AP having a plurality of small granularity processes since the addition or subtraction of any one process is likely to have a very small impact on the total PO of the subject AP. It will be appreciated that adding or subtracting a large granularity process to an AP will have a substantial impact on the total PO of the AP. For example, in the illustrative MSC 10 application, there are only about 4-12 large granularity processes per AP where each occupies a substantial fraction of the total available PO of each AP. In such situations, being able to accurately determine the real impact of adding another large granularity process to an AP is important in order not to inadvertently overload the AP.

The ability to accurately predict loading per process is important in a variety of applications. For example, load balancing is important in multiprocessor environments that require high reliability wherein processes running on each processor are pre-assigned to and replicated on other processors for backup purposes so that in the event of a failure of a processor the corresponding backup processes can be activated on the other processors. In general, APs supporting relatively complex telecommunication switching applications, distributed financial transaction systems, distributed security authentication systems, and factory floor real-time control systems may likely contain large granularity processes.

Figure 1:
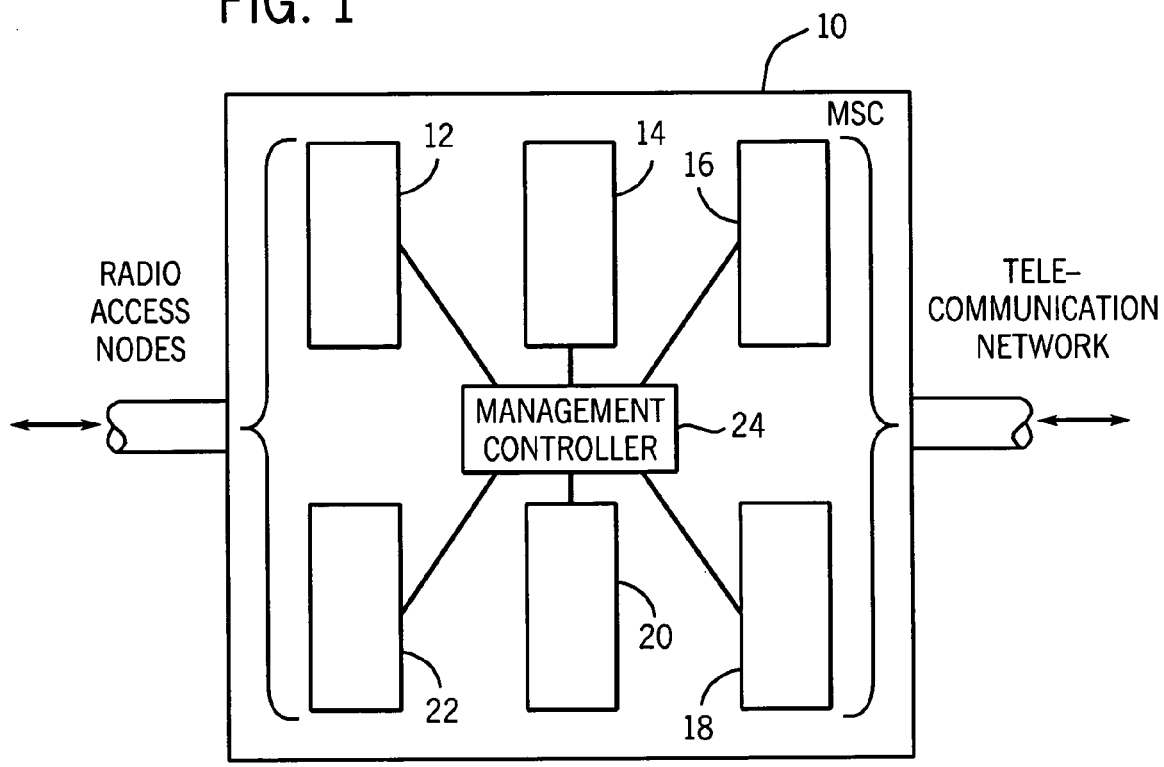
FIG. 1 illustrates an exemplary embodiment in accordance with the present invention of a mobile switching center (MSC) that includes a plurality of application processors.

Referring to FIG. 1, a MSC 10 is utilized as part of a wireless telecommunication system and has the responsibility for establishing and determining communication paths between a plurality of wireless subscribers supported via radio access nodes and a telecommunication network. The MSC 10 includes application processors (AP) 12, 14, 16, 18, 20 and 22 that are each supported by a management controller 24. Each of the application processors is responsible for controlling communications involving a plurality of radio clusters, i.e. radio access nodes. Management controller 24 may control a variety of functions for the application processors such as operations, administration and maintenance functions. In the illustrative embodiment the management controller 24 collects data relating to the operation of the application processors, calculates scaling statistics based on this data, determines the additional capacity required to run an additional process, and controls the assignment of backup processes among the application processors to equalize processor occupancy (PO) across the application processors. The statistics utilized and the calculation of additional PO due to running another process by an application processor will be described in detail below.

Figure 2:
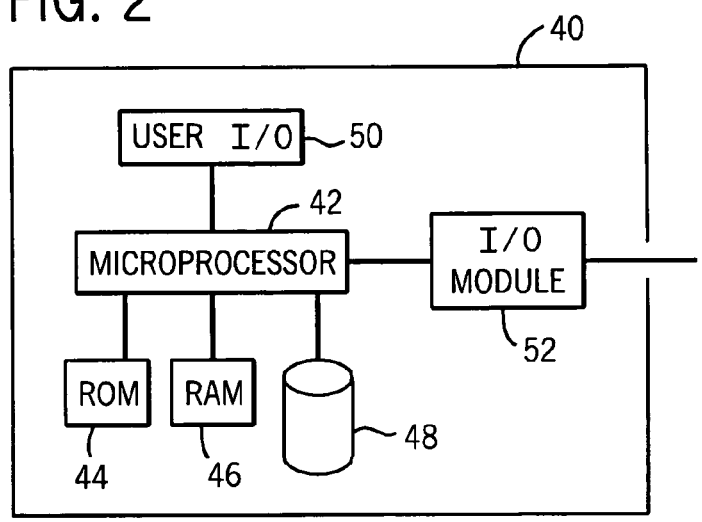
FIG. 2 is a block diagram of an exemplary architecture representative of the computing elements of FIG. 1.

FIG. 2 illustrates a block diagram of a computing apparatus 40 that may be utilized to implement each of the application processors and the management controller of FIG. 1. A microprocessor 42 is supported by read-only memory (ROM) 44, random access memory (RAM) 46, and a nonvolatile data storage device 48 such as a hard disk drive. The user input/output (I/O) 50 may comprise various known apparatus for providing inputs to the microprocessor such as a keyboard, mouse, etc. as well as apparatus for receiving outputs from the microprocessor such as a display monitor, printer, etc. The I/O module 52 provides interface in communication support between the microprocessor 42 and the external environment. As will be known to those skilled in the art ROM 44 will typically contain at least sufficient portions of an operating system that will be accessed during boot-up time to enable the operating system, the majority of which may be contained in device 48, to be loaded. Next, various application programs which may also be stored in device 48 will be loaded and executed in cooperation with the operating system. Steps and decisions made in accord with embodiments of the present invention are implemented by such programs. Based on the information provided herein, those of ordinary skill in the art will understand how to implement these steps and decisions in appropriate programs. Portions of the operating system and the application programs will likely be loaded into RAM 46 to permit rapid read/write access by the microprocessor. Data acquired by the microprocessor as well as computations and decisions made by the microprocessor may be temporarily stored to RAM 46 or placed in permanent storage in device 48 depending upon the nature and use of the information.

A brief overview of aspects associated with embodiments of the present invention will assist in an appreciation of the present invention and its advantages. Although the AP 12-22 are part of a heterogeneous computing environment, each AP does not necessarily have identical processing power. Processing power refers to the amount of CPU time, commonly known as processor occupancy PO, required by a process. For example, different microprocessors running at different speeds used in the APs would result in potentially significant differences in processing power among the various application processors. Even if the same microprocessor were used in the application processors, a different amount of cache memory or different supporting RAM memory and/or peripherals with different speed of access and/or flexibility would affect the processing power of the application processor. Therefore, determining that a process running on AP 12 requires 20% PO does not mean that the same process if run on AP 14 will require 20% PO. Significantly more or less than 20% PO may be appropriate to accommodate the same process by AP 14 in view of differences in computing power between AP 12 and AP 14.

Further, it cannot be assumed that the amount of PO used by the process itself is the only work done by the application processor on behalf of the process. That is, running a particular process may require certain auxiliary supporting processes to be initiated and/or run that will cause a further increase in the total PO required. Although the additional PO may not be part of the process itself, the additional PO must be performed by the AP and hence constitutes part of the total PO associated with the subject process.

In order to be able to assign a backup copy of a process running on one AP to another AP with the knowledge of the total PO that would be placed on the other AP in the event of an activation of the backup copy, the total PO attributable to the backup copy process must be known. Further, the total PO attributable to the subject process running on its host AP must be scaled appropriately in order to predict the impact of activating its backup copy on the other AP which may have a different processing power than the host application processor.

In accordance with the exemplary embodiment, the management controller 24 accumulates data accumulated over daily and/or weekly time intervals and generates corresponding statistics for: the PO consumed by each of the processes, the amount of useful work done by the processes, the total PO used by the AP, and the amount of useful work done on the AP. The PO for each process is easily obtainable from the operating system such as from Sun Solaris by examining the /proc/<pid>/usage file.

An aspect of this invention resides in the recognition of the need to determine a statistic with a proportional and preferably linear relationship with the processor's total PO. It was determined that the number of messages transmitted by a processor has such a relationship in the exemplary telecommunication embodiment. It will be appreciated that in other embodiments other measurable events may have this desired relationship with processor PO. Thus, the amount of useful work done by the processor is done indirectly based on the number of messages transmitted by a subject AP. Messages constitute a relatively heavily used form of inter-process communication in the exemplary embodiment and have been determined to have a proportional, if not linear, relationship with the amount of processor PO consumed. Linear regression of the relationship between the PO consumed and the amount of work done by a process can be calculated for each AP. The slope and intercept of this linear relationship defines the CPU cost of a unit of work on each AP. This value is referred to as the processor scaling factor; see FIG. 3.

Figure 3:
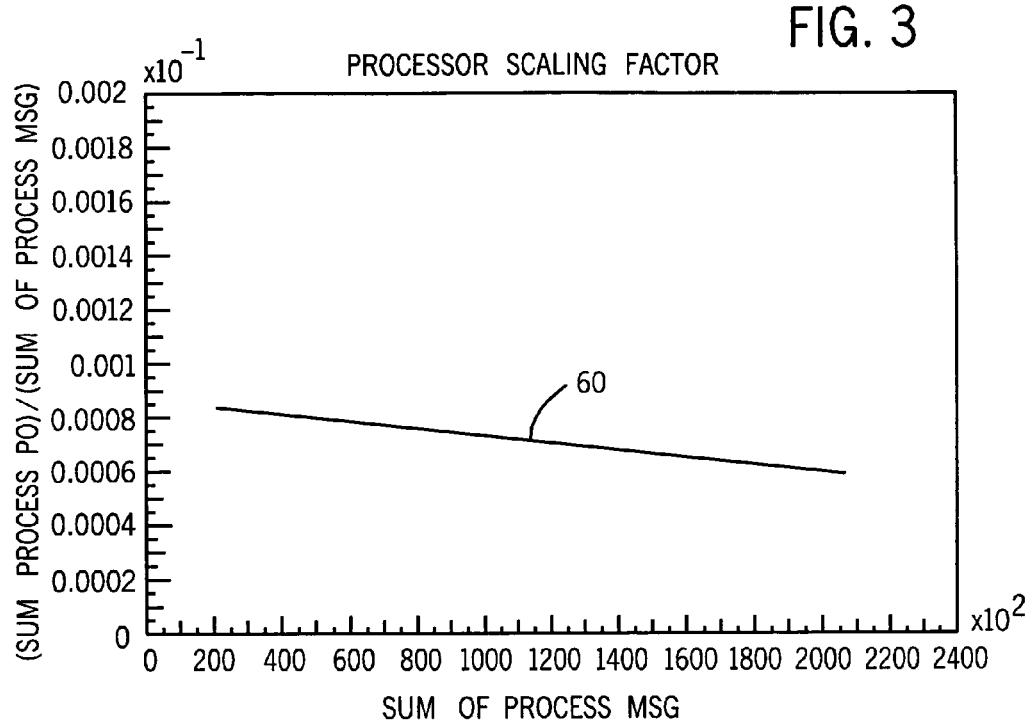
FIG. 3 is a graph illustrating measurements by which a processor scaling factor can be determined.

In FIG. 3 the horizontal axis represents the sum of messages associated with the processes running on an AP. The vertical axis represents the sum of the PO of the processes running on the subject AP divided by the sum of the messages associated with the processes running on the AP. As shown, the straight-line 60 with a slightly negative slope represents a best fit to a series of data points collected over a substantial period of time, e.g. a week.

The expected PO directly attributable to the subject process on the other AP can be computed by multiplying the subject process's PO on the host machine by the ratio between the other AP's scaling factor and host machine's scaling factor. For example, if AP 12 has a scaling factor of 1 and a subject process consumed 6% of the PO there, and the process was moved to AP 14 with a processor scaling factor of 2, we would expect the subject process to directly consume 12% (6%*(2/1)) of AP 14's PO.

Other calculations can utilize the information identified in accordance with an embodiment of the present invention to detemine the expected PO directly attributable to the subject process on the other AP. For example, it can be computed by multiplying the number of messages associated with subject processes on the host machine by the other AP's scaling factor. For example, if AP 12 has a scaling factor of 1 and has 400 messages associated with the subject process (i.e. where the number of messages is proportional to the PO), and the process was moved to AP 14 with a processor scaling factor of 2, we would expect the subject process to be equivalent to 800 messages running on AP 14 (400*2). If 400 messages on AP 12 represented 10% PO, then moving the subject process to AP 14 would result in 20% PO on AP 14 (10%*2).

As mentioned above, in addition to accounting for differences in processor power between two heterogeneous APs, differences in the consumption of PO should be accounted for auxiliary "helper" processes related to the work done in executing the primary/main process. Generating a statistic to represent the amount of PO associated with auxiliary processes for an AP is done indirectly. That is, this statistic is based on a proportional, if not linear, relationship. It was determined that the total PO consumed by an AP grows proportionally with the total PO consumed by the processes on the AP. The slope and intercept of the straight-line defines the auxiliary costs of work done by a process on an AP. This value is referred to as the overhead scaling factor.

Figure 4:
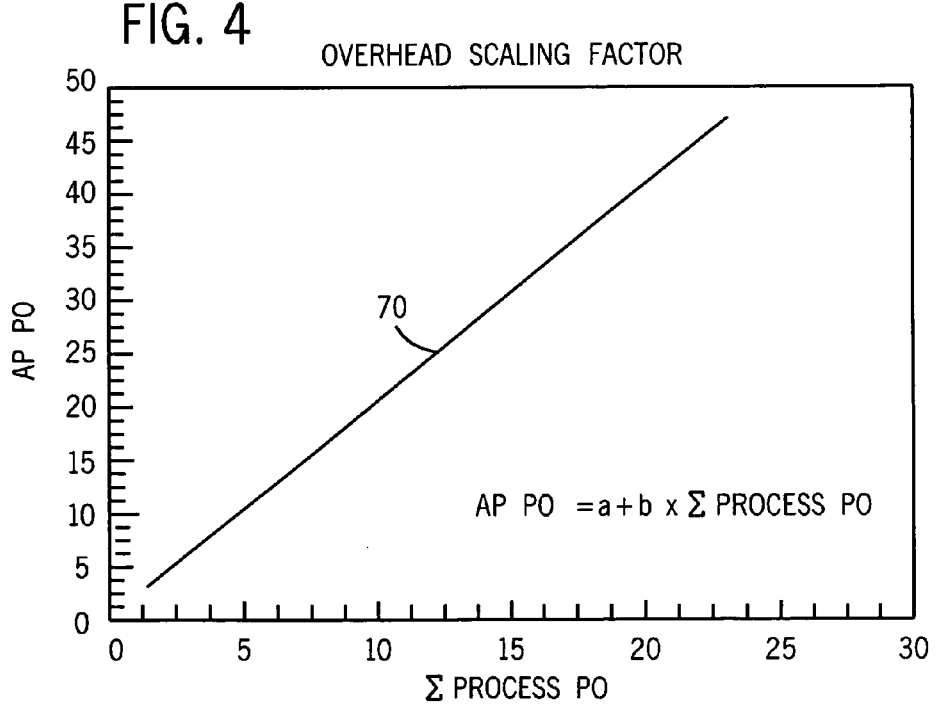
FIG. 4 is a graph illustrating measurements by which an overhead scaling factor can be determined.

In FIG. 4 the horizontal axis represents the sum of the PO for processes running on an AP. The vertical axis represents the total PO of the subject AP. The illustrated straight-line 70 has a positive slope, as expected, indicating that the total PO for an AP increases as the PO for the processes running on the AP increases. The value for the total PO of an AP (AP PO)=a+ (b×sum of PO for processes); where a and b represent constants from the well-known formula for straight-line that have been derived based on empirical data measurements. It will be apparent to those skilled in the art that the values of a and b will vary depending upon the specific functions being executed by the processes and the amount of auxiliary processes/work required in support of the main processes being run on an AP. These values can be established by collecting empirical data related to the execution of the processes being implemented in the intended environment. This empirical data is preferably continuously updated at time increments appropriate for the applications being performed. For example, empirical data can be collected and updated every five minutes for the APs as utilized in the illustrative MSC 10.

The total affect of the subject process on the other AP's PO is computed by multiplying the resulting PO as explained above by the overhead scaling factor for the other AP. For example, if the PO directly attributable to the subject process on AP 14 is 12% and the overhead scaling factor for AP 14 is 1.1, then the total expected impact to AP 14's PO is 13.2% (12%*1.1).

The use of the processor scaling factor and the overhead scaling factor provide a powerful solution to the problem of projecting the amount of additional PO that will be incurred by an AP based on the addition of a process being run on another AP. The usefulness of the scaling factors is unaffected by changes in hardware and/or software since the scaling factors are preferably updated based on empirical data so that the scaling factors will continue to reflect current conditions. This minimizes the need for human intervention to re-characterize the performance of the APs due to hardware or software changes.

Referring to FIG. 5, an illustrative method in accordance with the present invention is illustrated by which a projection is made of the actual increase in total processor occupancy of an AP due to the loading and running of the subject process. In step 80 first empirical data is periodically collected for each AP. This data is related to the PO loading of each AP due to each primary process running on the AP. In step 82 a processor scaling factor is computed for each AP based on a linear regression of the first empirical data. In step 84 second empirical data is periodically collected for each AP related to the PO loading of the AP due to auxiliary processes associated with the running of the primary processes. In step 86 an overhead scaling factor is computed for each AP based on linear regression of the second empirical data. In step 88, for a subject primary process running on a first AP, the processor scaling factor of the first AP is compared to the corresponding overhead scaling factor of a second AP such as by using their ratio. The amount of the actual increase in total processor occupancy of the second AP is determined by multiplying the amount of PO of the process on the first AP by the ratio of the overhead scaling factors of the first and second APs, then accounting for the overhead associated with the process by multiplying by the overhead scaling factor of the second AP. This determines the total additional PO the second AP would experience if the subject process were loaded and run on the second AP.

Although exemplary implementations of the invention have been depicted and described in detail herein, it will be apparent to those skilled in the art that various modifications, additions, substitutions, and the like can be made without departing from the spirit of the invention. For example, the functions of management controller 24 could be distributed among the APs or assumed by one of the APs. Alternatively, this function could be performed remote from the site of the APs with data for updating the scaling factors transmitted to the remote location and control signals implementing process load management transmitted from the remote location to the APs. Various time intervals can be selected for collecting the data to be used for updating the scaling factors, with the time interval being sufficiently frequent relative to the normal fluctuations of work performed as APs to provide reliable information especially as to periods of maximal loading. Various mathematical computations using the two scaling factors can be employed to determine total additional PO that an AP will experience upon adding a process.

The scope of the invention is defined in the following claims.

We claim:

1. A method for implementing load management for large granularity processes on application processors (APs) comprising the steps of:

collecting first data associated with primary large granularity processes running on each AP, wherein the first data is proportional to processor occupancy (PO) for the primary processes running on each AP;

collecting second data associated with auxiliary processes running on each AP, wherein the auxiliary processes directly support the primary processes running on the respective AP, and the second data is proportional to PO for the auxiliary processes running on each AP;

calculating for each AP a processor scaling factor and an overhead scaling factor based on the first and second data, respectively; and for a first large granularity process running on a first AP, determining a total amount of additional PO a second AP would incur to run the first process, wherein said determination comprises calculating a first amount by applying at least the second processor scaling factor to a value related to an amount of PO of the first process running on the first AP, and applying the second overhead scaling factor to the first calculated amount to reflect additional PO due to auxiliary processes.

2. The method of claim 1 wherein the first and second data are periodically collected over a time interval of sufficient length to produce a high probability of having encountered periods of maximum loading.

3. The method of claim 1 further comprising the step of storing for each AP a corresponding processor scaling factor and overhead scaling factor.

4. The method of claim 3 further comprising the step of updating the stored processor scaling factor and overhead scaling factor for each AP based on newly collected periodic first and second data, respectively.

5. The method of claim 1 wherein a large granularity process is defined by a process resulting in a corresponding PO on an AP of 3%-30%.

6. The method of claim 1 wherein each of the steps is automatically implemented by an apparatus utilizing a microprocessor.

7. The method of claim 1 wherein the step of determining comprises the total amount determined by applying a ratio of the first and second processor scaling factors to a value related to an amount of primary process PO of the first process running on the first AP to calculate a first amount, and applying the second overhead scaling factor to the first amount to reflect additional PO due to auxiliary processes.

8. The method of claim 1 wherein the the step of determining comprises the total amount determined by multiplying the second processor scaling factor times a value related to an amount of primary process PO of the first process running on the first AP to calculate a first amount, and applying the second overhead scaling factor to the first amount to reflect additional PO due to auxiliary processes.

9. A method implemented by a computing system for determining load management for large granularity telecommunication processes on telecommunication application processors, APs, comprising the steps of:
 collecting first data associated with primary large granularity telecommunication processes running on each telecommunication AP, where the first data is proportional to processor occupancy, PO, for the primary processes running on each AP;
 collecting second data associated with auxiliary processes running on each telecommunication AP where the auxiliary processes directly support the primary telecommunication processes running on the respective AP, where the second data is proportional to PO for the auxiliary processes running on each AP;
 calculating for each telecommunication AP a processor scaling factor and an overhead scaling factor based on the first and second data, respectively;
 determining a total amount of additional PO a second telecommunication AP would incur to run a first large granularity process where the first process is running on a first telecommunication AP, where the total amount includes a first amount, the first amount of additional PO due to the primary large granularity processes being determined by applying at least the second processor scaling factor to a value related to an amount of primary process PO of the first process running on the first AP, and the total amount determined by applying the second overhead scaling factor to the first amount to reflect additional PO due to auxiliary processes.

10. The method of claim 9 wherein the first and second data are periodically collected over a time interval of sufficient length to produce a high probability of having encountered periods of maximum loading.

11. The method of claim 9 wherein the the step of determining comprises the first amount determined by multiplying the second processor scaling factor times a value related to an amount of primary process PO of the first process running on the first AP to calculate a first amount.

12. The method of claim 11 wherein the value is a number of messages associated by the primary process running on the first AP.

13. The method of claim 9 wherein a large regularity process is defined by a process resulting in a corresponding PO on an AP of 3%-30%.

14. The method of claim 9 wherein wherein the step of determining comprises the first amount determined by applying a ratio of the first and second processor scaling factors to the value related to the amount of primary process PO of the first process running on the first AP to calculate a first amount.

15. The method of claim 9 wherein the first data comprises a count of the number of messages generated by a telecommunication AP during a predetermined time interval.

16. A computing apparatus adapted for determining load management for large granularity processes on application processors, APs, comprising:
 means for periodically collecting first data associated with primary large granularity processes running on each AP, where the first data is proportional to processor occupancy, PO, for the primary processes running on each AP;
 means for periodically collecting second data associated with auxiliary processes running on each AP where the auxiliary processes directly support the primary processes running on the respective AP, where the second data is proportional to PO for the auxiliary processes running on each AP;
 means for calculating for each AP a processor scaling factor and an overhead scaling factor based on the first and second data, respectively;
 means for determining a total amount of additional PO a second AP would incur to run a first large granularity process where the first process is running on a first AP, where the total amount is determined by applying at least the second processor scaling factor to value related to n amount of primary process PO of the first process running on the first AP to calculate a first amount, and applying the second overhead scaling factor to the first amount to reflect additional PO due to auxiliary processes.

17. The computing apparatus of claim 16 further comprising means for storing a corresponding processor scaling factor and overhead scaling factor for each AP, and means for updating the stored processor scaling factor and overhead scaling factor for each AP based on newly collected periodic first and second data, respectively.

18. The computing apparatus of claim 16 wherein a large regularity process is defined by a process resulting in a corresponding PO on an AP of 3%-30%.

19. The computing apparatus of claim 16 wherein the means for periodically collecting the first data comprises means for counting of the number of messages generated by an AP during a predetermined time interval.

20. The computing apparatus of claim 16 wherein the large granularity processes comprise large granularity telecommunication processes run on telecommunication application processors.

* * * * *